(12) United States Patent
Ebert et al.

(10) Patent No.: US 7,724,258 B2
(45) Date of Patent: May 25, 2010

(54) COMPUTER MODELING AND ANIMATION OF NATURAL PHENOMENA

(75) Inventors: David S. Ebert, Lafayette, IN (US); Joshua Schpok, Glendale, CA (US)

(73) Assignee: Purdue Research Foundation, West Lafayette, IN (US)

(*) Notice: Subject to any disclaimer, the term of this patent is extended or adjusted under 35 U.S.C. 154(b) by 684 days.

(21) Appl. No.: 11/172,098

(22) Filed: Jun. 30, 2005

(65) Prior Publication Data

US 2006/0087509 A1 Apr. 27, 2006

Related U.S. Application Data

(60) Provisional application No. 60/584,247, filed on Jun. 30, 2004.

(51) Int. Cl.
*G06T 13/00* (2006.01)

(52) U.S. Cl. ........................ 345/473; 345/419; 345/630; 345/621

(58) Field of Classification Search ................ 345/419, 345/621, 473, 630
See application file for complete search history.

(56) References Cited

U.S. PATENT DOCUMENTS

| | | | | |
|---|---|---|---|---|
| 5,442,733 | A * | 8/1995 | Kaufman et al. | 345/424 |
| 5,850,352 | A * | 12/1998 | Moezzi et al. | 345/419 |
| 6,002,401 | A * | 12/1999 | Baker | 715/839 |
| 6,272,366 | B1 * | 8/2001 | Vining | 600/407 |
| 6,285,380 | B1 * | 9/2001 | Perlin et al. | 345/473 |
| 7,148,887 | B2 * | 12/2006 | Kaufman et al. | 345/419 |
| 7,212,202 | B2 * | 5/2007 | Weaver | 345/420 |
| 7,233,326 | B1 * | 6/2007 | Silva et al. | 345/419 |

OTHER PUBLICATIONS

Procedural modeling of cities Yoav I. H. Parish, Pascal Müller Aug. 2001 SIGGRAPH '01: Proceedings of the 28th annual conference on Computer graphics and interactive techniques Publisher: ACM.*

A virtual node algorithm for changing mesh topology during simulation Neil Molino, Zhaosheng Bao, Ron Fedkiw Aug. 2004 ACM Transactions on Graphics (TOG), vol. 23 Issue 3 Publisher: ACM.*

Visualizing simulated room fires (case study) Jayesh Govindarajan, Matthew Ward, Jonathan Barnett Oct. 1999 VIS '99: Proceedings of the conference on Visualization '99: celebrating ten years Publisher: IEEE Computer Society Press.*

(Continued)

*Primary Examiner*—Javid A Amini
(74) *Attorney, Agent, or Firm*—Valauskas & Pine LLC (57) ABSTRACT

3D graphics animation is increasingly used in movies and virtual reality computer games to produce realistic visual simulations of physical and natural phenomena. The animation of diffuse liquids such as gases is an indispensable component in such special effects. The present system and methods utilize physically-based and more intuitive procedurally-based simulation techniques to simulate and render natural phenomena in computer graphics. The present invention facilitates user interaction in order to generate a variety of gas effects, for example, waves within water, plumes within hot gas, and flames within fire. Improved user interaction is achieved by improving rendering performance and introducing a new method of high-level control for Eulerian simulations.

19 Claims, 9 Drawing Sheets

OTHER PUBLICATIONS

Adrien Treuille, Antoine McNamara, Zoran Popović, Jos Stam, Keyframe control of smoke simulations , ACM Transactions on Graphics (TOG), vol. 22 Issue 3 Jul. 2003.*

Interactive modeling of trees by using growth simulation Katsuhiko Onishi, Shoichi Hasuike, Yoshifumi Kitamura, Fumio Kishino Oct. 2003 VRST '03: Proceedings of the ACM symposium on Virtual reality software and technology Publisher: ACM.*

3D IBFV: Hardware-Accelerated 3D Flow Visualization Alexandru Telea, Jarke J. van Wijk Oct. 2003 VIS '03: Proceedings of the 14th IEEE Visualization 2003 (VIS'03) Publisher: IEEE Computer Society.*

The State of the Art in Flow Visualisation: Feature Extraction and Tracking by Frits H. Post A, Benjamin Vrolijk A, Helwig Hauser B, Robert S. Laramee B, Helmut Doleisch B; V. 22 2003 No. 4 pp. 1-17.*

Visual Simulation of Experimental Oil-Flow Visualization by Spot Noise Images fromNumerical Flow Simulation Willem C. de Leeuw , Hans-Georg Pagendarm , Frits H. Post, Birgit Walter Delft University of Technology, Faculty of Technical Mathematics and Informatics, Julianalaan 132, 2628 BL Delft, The Netherlands. Deutsche Forschungsan, 2003.*

A Graphics Hardware-Based Vortex Detection and Visualization System; pp. 195-202 Year of Publication: 2004 ISBN:0-7803-8788-0 Authors Simon Stegmaier University of Stuttgart Thomas Ertl University of Stuttgart.*

Nick Rasmussen, Duc Quang Nguyen, Willi Geiger, Ronald Fedkiw with title of "Smoke simulation for large scale phenomena", Jul. 2003 ACM.*

Structural modeling of flames for a production environment Arnauld Lamorlette, Nick Foster Jul. 2002 CIGGRAPH '02: Proceedings of the 29th annual conference on Computer graphics and interactive techniques Publisher: ACM.*

A novel approach to vortex core region detection Ming Jiang, Raghu Machiraju, David Thompson May 2002.*

Feature flow fields H. Theisel, H.-P. Seidel May 2003.*

* cited by examiner

| Attribute | Function |
|---|---|
| Opacity | *plane opacity* = Opacity ÷ *slicing planes*<br>Adjusts the overall transparency of the cloud. |
| Quality | *slicing planes* = Quality<br>Increasing the total slicing planes by resolving a finer image with greater continuity, but at the expense of performance. |
| Detail | $\beta$*inertia*<br>The fractal scaling of texture coordinates. |
| Dirtiness | *shadow magnitude* = Dirtiness ÷ *plane opacity*<br>Adjusts how fast the cloud darkens. |
| Focus | $W' = W^{1+focus}$<br>Adjusts the opacity roll-off so that noise variation is sharper or smoother. |
| Noise Media | $W =$<br>cumulus : \|*noise*\|<br>stratus : *noise*<br>wispy : 1−\|2 x *noise*\|<br>cumulus : $(1+|10 \times noise|)^{-1}$<br>Presents noise filters in a user-friendly qualitative manner. |
| Wind | $\|\xi\|$<br>A direction and magnitude widget to express "wind" direction. |
| Torque | $\nabla \times \xi$<br>A direction and magnitude widget to express fractal texture rotation. |

FIG. 9

COMPUTER MODELING AND ANIMATION OF NATURAL PHENOMENA

This application claims priority to U.S. Patent Ser. No. 60/584,247 filed Jun. 30, 2004.

This invention was made with government support under grant reference number NSF ACI-0222675, NSF ACI-0081581, NSF ACI-0121288, NSF IIS-0098443, NSF ACI-9978032, NSF MRI-9977218, NSF ACR-9978099 awarded by National Science Foundation and the DOE Views program. The Government has certain rights in the invention.

FIELD OF THE INVENTION

The invention relates generally to the computer modeling and animation of natural phenomena including generally amorphous phenomena such as diffuse liquids.

BACKGROUND OF THE INVENTION

There is a growing interest in the development and use of 3D graphics animation for realistic visual simulations of physical and natural phenomena. Among other industries, the entertainment industry seeks to develop and use such simulations in movies and virtual reality computer games. Among many other challenges, simulating and rendering liquids including diffuse liquids is a difficult problem in computer graphics. The behavior and appearance of gaseous phenomena is physically complex. Simulation research has attempted to reduce the problem to specific kinds of gases. Solving the simulation of diffuse liquids problem is advantageous in that it is a subset of applications for more general work in flow modeling and translucent volume rendering.

Simulation methods attempt to produce realistic images by approximating the physical processes within gaseous phenomena, such as waves in water, plumes in hot gas, flames in fire, and condensation in clouds. Computational fluid simulations can produce what appear to be realistic images and movement of gaseous phenomena. However, large scale high-quality simulation severely taxes commodity computational resources even with the recent breakthroughs in real-time fluid simulation. Modeling amorphous phenomena by conventional simulation approaches is a slow offline process. Artists utilizing these approaches currently use and manipulate low-complexity avatars as placeholders for high-quality simulation. Fine tuning the results of these approaches is a very slow, iterative process. The tweaking of physical parameters may result in no observable consequence or may give rise to undesirable side-effects, including the loss of precision and numeric instability. Unpredictable results may be introduced from approximations in low resolution calculations during trial renderings. Physics-based interfaces can also be very cumbersome and non-intuitive for artists to express their intention and can limit the animation by the laws of physics.

In contrast to these known methods, the procedural approach can easily approximate phenomenological modeling techniques by generalizing high-level formation and evolution characteristics. These methods rely on mathematical primitives, such as volumetric implicit functions, fractals, Fourier synthesis, and noise to create the basic, structure of the clouds. The procedural approach often produces more controllable results than true simulation and in much less time. First, these models formulate the high-level cloud structure, such as fractal motion or cellular automata. Then, the model is reduced to renderable terms, such as fractals, implicits, or particles. Many versions of this approach use volumetric ellipsoids to roughly shape natural phenomenon, then add detail procedurally.

Currently, interactive gaseous environments are designed by using physically-based models or qualitative approximations to efficiently emulate the phenomena. Qualitative approximations are typically more effective as a modeling tool, but may not realistically capture the important nuances provided through a more exhaustive simulation.

Gas modeling poses a computational and modeling dilemma, balancing accuracy and efficiency. Realistic fluid dynamics is modeled over a spatial and temporal continuum. Choosing appropriate numerical approximations, along with sufficiently scaling resolution, plays an important role in achieving realistic yet efficient results. By making assumptions about the medium's behavior, approximations can be made for the gas structure and motion.

Physically-based approaches are the most common method to computationally simulate gases. Typically, Navier-Stokes equations are used for ideal incompressible fluid flow. For example, a flow field $\xi$:

$$\frac{\partial \xi}{\partial t} = -(\xi^T \nabla)\xi - \frac{\nabla p}{\rho} + v(\nabla^T \nabla)\xi + f \quad \text{(Equation 1)}$$

$$\nabla^T \xi = 0 \quad \text{(Equation 2)}$$

where scalars $\rho$ represents material density, p its pressure, and v its viscosity. The symbol $\nabla$ represents a vector of spatial partial derivatives. In 3D, $\nabla=[\partial/\partial x, \partial/\partial y, \partial/\partial z]^T$. The first term in Equation 1 advects velocities through the velocity field ("self-advection"). The second term diffuses velocity along the pressure gradient, and the third dampens flow by viscosity. The final term includes any external forces such as gravity or user interaction by f. Equation 2 simply states flow field are divergence-free, thus preserving energy.

Much effort has been focused on developing solvers. To ensure unconditional stability of the Eularian solvers' numerical techniques, the method of characteristics is used, and a Hodge decomposition isolates divergent forces violating incompressibility. Simply removing these forces and grid based aliasing leads to numerical dissipation, motivating techniques reseeding energy, and staggered grids.

Even with these improvements, models are usually adapted to the task at hand. Solvers have been specially suited to simulate fire, smoke, and clouds. Other simulators additionally integrate strain and stress to simulate and control viscous and viscoelastic fluids. To support even larger domains, special grid structures have been developed to approximate intermediate values and implement octree encoding.

As gas and water simulations in computer graphics run faster and appear more realistic, more attention has been focused on controlling fluid flows. Early work used flow primitives to apply a particular kind of force in a primitive's vicinity. More sophisticated techniques seek solving for the forces necessary to push density from one defined configuration to another. This problem of keyframing densities can be presented as a problem of optimizing the driving forces and calculating the inter-frame derivatives. New solutions employ the adjoint method, or avoid optimization using coarser closed-form approximations.

Lagrangian simulations give rise to useful control techniques, but it is difficult to efficiently model continuous interfaces and varying densities of media exclusively with particle-particle interaction. In most cases simulations are reserved for fluids where interfaces are surfaces. In flow, it is not uncommon to combine both representations to leverage additional control, add additional particulate detail, preserve interfaces boundaries in fluids, and to preview more lengthy simulations.

In addition to physically-based approaches, there are also qualitative approaches. Addressing gas modeling issues of performance and control, procedural models are used to generate gaseous structures and motion. Rather than recreating the dynamics of the gassy media, procedural methods pursue simple mathematical primitives encapsulating the higher-level structure and flow behavior. These models may also be simpler to render, smaller to store, so that some applications convert grid-based volumes to procedural forms for this reason.

Blobbly models—also known as metaballs, implicit models, soft objects, or simply blobbies—provide a popular representation for billowy gases, a subvolume of density, or, for example clouds. These substructures are expressed with a Gaussian function or some other distance-based function. Provided their smooth blending, they make an intuitive modeling primitive to roughly shape clouds. Additional detail can be generated with noise, but in some approaches, automatically generated blobs are small enough to be directly rendered.

Procedural noise can also be used to create the basic structure of the clouds, along with fractals and Fourier synthesis. This provides a less controllable paradigm to shape gases, as they are intentionally unstructured and chaotic.

Slow kinds of gas motion can be emulated with basic texture warping and moving the underlying modeling primitives. More sophisticated approaches build phenomenological models with fractal motion or cellular automata to more realistically evolve gas motion. These methods still rely on some underlying primitive to render, and are usually combined with the previous primitives to produce a complete modeling and rendering system.

Correct gas illumination and shading is a difficult problem that must be addressed to produce convincing images and animations. Realistic radiosity solutions consider every visible point indirectly affected by all other points in space, posing a computationally exhaustive mathematical model. To pursue more efficient formulations, less general approaches are often considered, specifically directed to the respresentation clouds, fog, fire, and dust. Through appropriate limiting assumptions, the radiosity can be reduced to a more manageable approximation. An equally challenging issue is representing this model in a renderable form. Ultimately, the gas must be projected onto a 2D screen, and must consider the related operations whether gas is modeled as a surface, discretized, or a continuous volume.

Physically-based approaches in computer graphics relative to gas illumination include early work directed to planetary light scattering in the atmosphere, producing blue and red skies. Basic planetary-scale clouds represented as surfaces accurately model light diffusion, accounting for reflection, absorption, and scattering by approximating the media's physical properties. Medium-scale clouds were produced using only surface reflectivity of user-created ellipsoids and modulating their opacity. This method was adapted to graphics acceleration hardware by using hardware-supported blending functions, and a method of rendering to off-screen buffers to perform an additional rendering pass. Through volume rendering, various lighting phenomena can be simulated. This extends the reflective and transmissive diffusion process of surfaces continuously through 3D densities.

Figure 1:
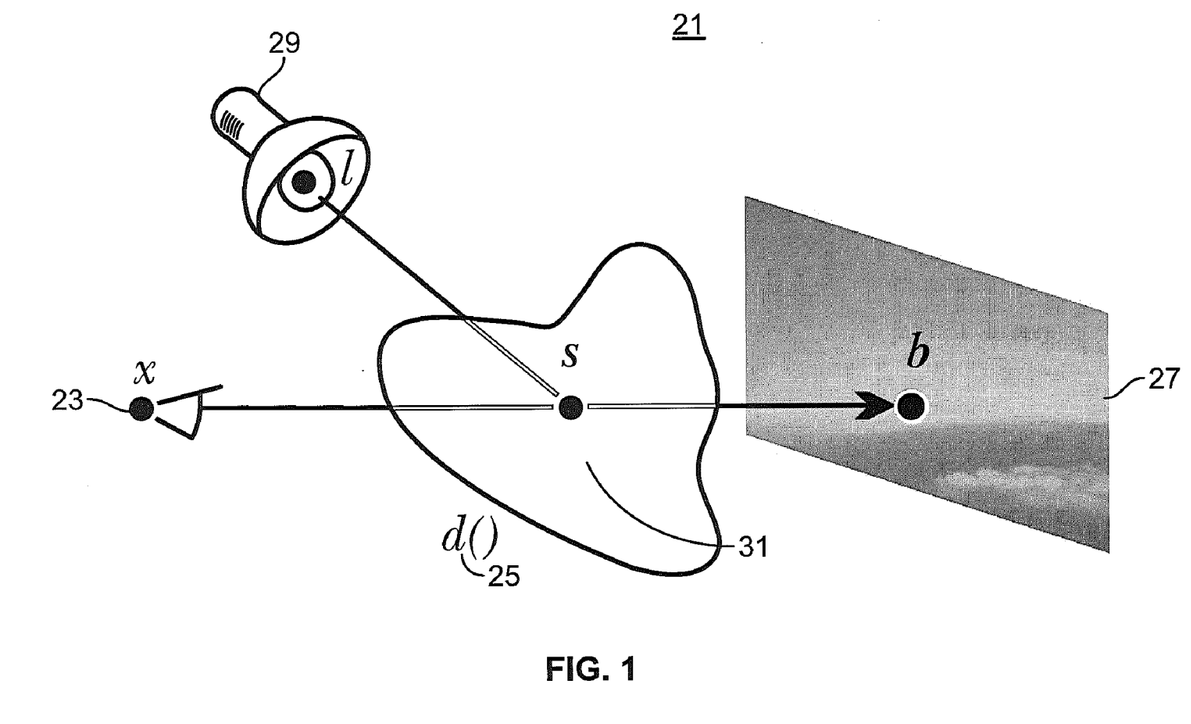
FIG. 1 illustrates a diagram of spatial variables as used in a volumetric rendering equation.

With reference to FIG. 1, spatial variables are used in a volumetric rendering equation. For an observer at point x, looking through the scalar field d( ), onto a background point b, with a single light source at point l, with d(s) as the volume density at point s, rendering can be generally expressed in terms of the volumetric rendering:

$$L(x)=L(b)T(b,x)+\int_x^b T(s,x)g(s)f(s)T(l,s)L(l)ds \qquad \text{(Equation 3)}$$

where L(b) is the background color or sky texture, L(l) is the color of the light source, g(s) is the emissive scattering term at point s, f( ) its reflectivity, and T(x, y) is the total opacity of the volume from x and y:

$$T(x,y)=e^{-\int_y^x d(s)ds} \qquad \text{(Equation 4)}$$

Equation 3 integrates through the visible volume, which in turn is lit by the fraction of light penetrating and reaching it through the volume. This approximation does not account for light scattering throughout the gas, which are significantly complicated calculations. Whereas Equation 4 only considers visible contribution along a ray, more complex phenomena must consider all the surrounding area as an emissive source.

Where present techniques only consider visible contribution along a ray, more complex phenomena must consider all the surrounding area as an emissive source. With a more general volumetric lighting model, previous work in surface shaded clouds have been extended to volumetric models using ray-tracing. Many methods have been proposed to account for more complex scattering effects instrumental in illuminating diffusive gasses and dramatic beams of light. This has been achieved through light-path integration, diffusion-based radiance point spreading, volumetric photon mapping, and simple analytic solutions through asserting assuming media homogeneity, particularly useful for skies.

Modern graphics accelerators enable high quality volume rendering at interactive rates using texture-based volume slicing. A fully interactive volume rendering model with limited scattering has been implemented by combining lighting and rendering passes, which can be further extended to physically-based lighting phenomena.

Provided the complexity of realistically conveying gas illumination by simulating light through translucent media, appearance oriented qualitative models have been developed. Efficiency can be improved by approximating volumetric elements with a collection of spherical primitives, and using an off-screen buffer to generate a shadow volume. Using a shadow buffer relies on both rendering to the buffer to accumulate the light extinction, and reading it back to for rendering. Since the loop back path from the shadow buffer to render buffer typically bottlenecks hardware accelerated renderers, some approached amortize the next frame's rendering while displaying the previous. Others resort to a coarser approximation on a CPU to completely avoid the memory lock on a GPU.

Animated gases are an indispensable component in special effects. However, the means of directing their intrinsically chaotic, turbulent behavior remains an open problem. Subtle and dramatic effects can be achieved practically with fog machines, pyrotechnics, and other means of capturing real natural phenomena. However, these effects offer only limited control, scale, and safety. Furthermore, it is not uncommon for artistic direction to seek physically-impossible behavior.

Computational gas models relieve the restrictions of physical approaches, but not without introducing new challenges. First, high-resolution detailed models require computational power that may be generally unavailable to the user, or simply require a frustrating length of time to simulate each frame.

Second, realistic gas models are often expressed in a mathematical way that can be generally inconvenient, and possibly unfamiliar, to more artist applications. However, both practical and simulated effects still lack a desirable level of control. While current techniques rely on creatively combining visible gas sources and jets, defining motion and gas structures at a finer level remains an open problem.

SUMMARY OF THE INVENTION

The present invention combines physically-based and more intuitive procedurally-based simulation techniques. Advantageously, the procedural elements are faster to compute and easier to control, but are driven by a low-resolution physical simulation, producing the amorphous peculiarities otherwise difficult to realistically shape by hand. The techniques are scalable and may be applied to the movie or film industry.

The present invention improves user interaction with computer-generated gases, for example, waves in water, plumes in hot gas, and flames in fire. Improved user interaction is achieved by improving rendering performance and introducing a new method of high-level control for Eulerian simulations.

An object of the present invention is a new gas modeling technique using feature extraction to create high level artistic controls that facilitate the production of a more realistic physical simulation. Density and flow elements of a Navier-Stokes simulation can be created and modified through a set of feature vortex, sink, source, or uniform advection components (collectively termed "primitives" herein).

While previous techniques enable these primitives solely as a persistent source of density or energy, the feature extraction process permits the application of these primitives in an initial frame and then allows for their refinement through interactive feature detection technologies as the simulation process continues. This not only provides a new modeling approach to establish initial conditions, but also permits the revision of recorded sequences. In addition to permitting user-defined features evolve naturally, the feature extraction process also identifies features naturally occurring in the field. This permits the selection and change of a feature's behavior as the simulation progresses, enabling a more "hands-on" approach to flow modeling.

The simulations are rendered interactively by a hardware-accelerated implementation of advected textures. This deterministic technique conveys detailed motion along the velocity field, and is scalable to higher resolution offline rendering while faithfully reflecting the design. Combined with the modeling approach, the system of the present invention produces realistic animated diffuse liquids through physically-based simulation, controlled with a set of intuitive high-level primitives.

A new gas dynamics modeling paradigm is demonstrated. By combining interactive gas simulation and interactive feature extraction, the system of the present invention identifies noticeable features in a simulation. The identified features can then be individually chosen and, using basic composition operations, repositioned and modified. Features, an output of flow fields, serve as flow primitives, that constitute an input mechanism for shaping the flow fields. This closed loop between output and input provides a unique contribution to flow modeling: flow primitives that can originate and evolve naturally by the fluid simulation. This effect makes user interaction appear more realistic in that not only will there be forces that drive a fluid simulation, but also the ability of users to harness the phenomena naturally occurring in the field.

To improve the efficiency of gas rendering, established methods in volume rendering are adapted to graphics hardware. A discretized volumetric representation of the gassy volume is stored as tessellated planes from which the Graphics Processing Unit (or "GPU") can interpolate intermediate values. Thus, the volume is sampled at a reduced resolution, suitable for high-level structures and interactive simulations. To add additional detail, procedural noise modulates gas opacity, and a set of filters permits the user to interactively adjust focus, opacity, and/or attenuation.

Special attention is paid to keep the rendering controls qualitatively independent so modifying one parameter will not affect others. While previous methods use amortized rendering techniques to achieve real-time performance, the present invention is a truly scalable rendering technique efficient enough for real-time video games, yet scalable to cinematic productions. Effort in creating compelling gas animation is greatly reduced through combining real-time gas rendering and modeling methods. Users need not wait hours for rendering and simulations, and simplified controls further accelerates the task of visually shaping the result. The present invention is applicable to several forms of phenomena, for example, waves in water, plumes in hot gas, flames in fire, and condensation in clouds.

DETAILED DESCRIPTION OF EMBODIMENTS OF THE INVENTION

One embodiment of the present invention includes a Graphics Processing Unit or GPU (termed herein also Visual Processing Unit, or "VPU"), is the microprocessor of a graphics card (or graphics accelerator) for a personal computer or game console. Modern GPUs are very efficient at manipulating and displaying computer graphics, and their highly-parallel structure makes these components more effective than typical Computer Processing Units ("CPU") for a range of complex algorithms.

Embodiments of the present invention utilize modern graphics hardware acceleration, whose architecture may shape the design and subsequent limitations of each technique's implementations. Hardware-based graphics acceleration currently has evolved from handling 2D pixel blitting (copying and setting the graphical frame buffer) to geometry rasterization and texturing.

Figure 2:
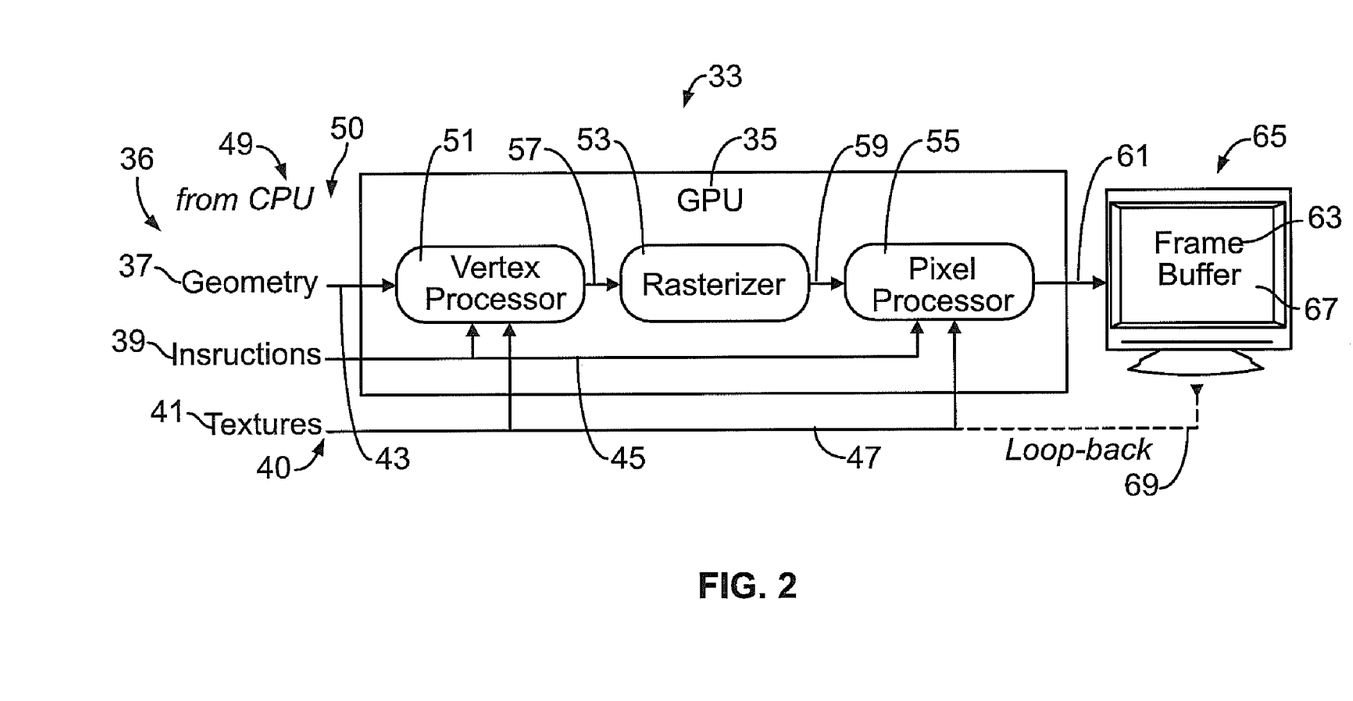
FIG. 2 illustrates a Graphics Processing Unit in communication with a Computer Processing Unit.

A GPU can implement a number of graphics primitive operations in a way that makes running them much faster than drawing directly to the screen with a host CPU. Embodiments of graphics accelerators typically include multiple processing components 33 such as shown in FIG. 2. As shown in FIG. 2, embodiments of the present system can include multiple processing components 33 that resemble a Multiple-Instruction, Multiple-Data (MIMD) architecture.

The embodiment of GPU 35 illustrated in FIG. 2 is able to execute on an information stream 36, such as geometry 37, instructions 39, and textures 41 on data streams 40, such as the illustrated multiple data streams 43, 45, 47. The CPU 49 may provide geometry 37, instructions 39, and textures information 41 as information input 50 to the GPU 35. In the case of graphics hardware, instructions data stream 45 of instructions information 39 may be expressed in graphical terms as shaders, simple functions traditionally used in per-vertex and per-pixel shading. Instructions data stream 45, in consequence, are vertices and pixels. Geometry information 37 includes polygonal objects such as tessellated planes. Instructions information 39 includes vertex and fragment programs. Textures information 41 includes OpenGL texture objects, which can be 1D, 2D, and 3D arrays of memory or data.

The embodiment of the GPU 35 illustrated in FIG. 2 can include GPU components, such as the illustrated vertex processor 51, a rasterizer 53, and a pixel processor 55. The vertex processor 51 is the processing unit on the graphics card that performs operations on each vertex that composes the geometry for rendering. The rasterizer 53 identifies which pixels each geometry polygon covers. The pixel processor 55 is the processing unit on the graphics card that executes operations for each geometric fragment generated by the rasterizer 53 for a pixel. In 3D computer graphics, a vertex is a point, or pixel, in 3D space with a particular location, usually given in terms of its x, y, and z coordinates. The vertex processor 51 determines the location of a pixel in 3D space from the geometry information 37, instructions information 39 and textures information 41 proivded from the CPU 49. The location of the pixel is transferred as a data file 57 to the rasterizer 53.

The rasterizer 53 provides a rasterizer data file 59 of structure representing a grid of pixels, or a graphics image, also referred to as a digital image. The color and intensity of each pixel can be individually defined by a pixel processor 55. The color and intensity of each pixel can be determined by instructions information 39 and textures information 41 from the CPU 49 in addition to the rasterizer data file 59. A pixel is one of the many tiny dots that make up the representation of a picture in a computer's memory. Usually the dots are so small and so numerous that, when printed on paper or displayed on a computer monitor, they appear to merge into a smooth image.

Upon the processing by the GPU 35 of the information input 50 provided by the CPU 49, a frame data file 61 of a frame buffer 63 is output. The frame buffer 63 may be a component of a computer 65 that can hold the graphics information for one frame or picture. The information of the frame data file 61 typically consists of color values for every pixel that can be displayed on the screen 67. A frame buffer 63 may be "off-screen"—that is, the frame data file 61 information is provided to the frame buffer 63 but doesn't appear on the visible screen—or "on-screen"—that is, the frame buffer 63 is directly coupled to the visible display screen 67.

GPUs 35 may not be load balanced. This condition produces bottlenecks if a particular processor is especially taxed. Often, the computations require multiple iterations or some data codependency incompatible with true parallelized architectures. To solve this problem, information from the frame buffer 63 may be read back to the GPU 35 via the loop-back path 69 as a textures information 41 data stream 47.

Since humans identify separate, discrete components in natural processes, that is waves within water, plumes within hot gas, and flames within fire, similar structures may be used as intuitive modeling and animation primitives. However, if not skillfully constructed, the collective result may appear unrealistic particularly because these structures are the products of complex local and global physical processes. On the other hand, physically-based simulations achieve realistic results by enforcing feasibility. Rather than directly modeling the features, the conditions may be controlled. This requires what may be termed a more scientific perspective of the phenomena (and the simulation algorithm). Most physics-based gas simulators use grid-based methods that are both numerically sensitive and computationally expensive.

Given the chaotic nature of gases, the results may be difficult to control and inconsistent over different resolutions and time-steps. Therefore, there is a trade-off between direct modeling techniques, which may not capture nor convey the nuances of amorphous phenomena, and physical simulations, which can be difficult to control. In visual effects, the goal is a compelling result regardless of physical accuracy.

Physics-based simulation and high-level flow primitives in the present system are combined to achieve visual realism without forfeiting all control to a dynamics-based solution. Visual realism and interactivity is achieved through an intuitive mouse-driven interface. The present system utilizes Eulerian simulation to produce a set of high-level features using interactive feature extraction techniques. With Eulerian simulation, vortices, uniform flows, divergences, and densities can be adjusted within the volume through ellipsoidal flow feature primitives. The system permits a user to adjust the parameters of a feature, thereby allowing changes to be sampled back into a simulation grid, and providing direct interaction with larger-scale flow behavior derived from the physics-based simulation.

Figure 3:
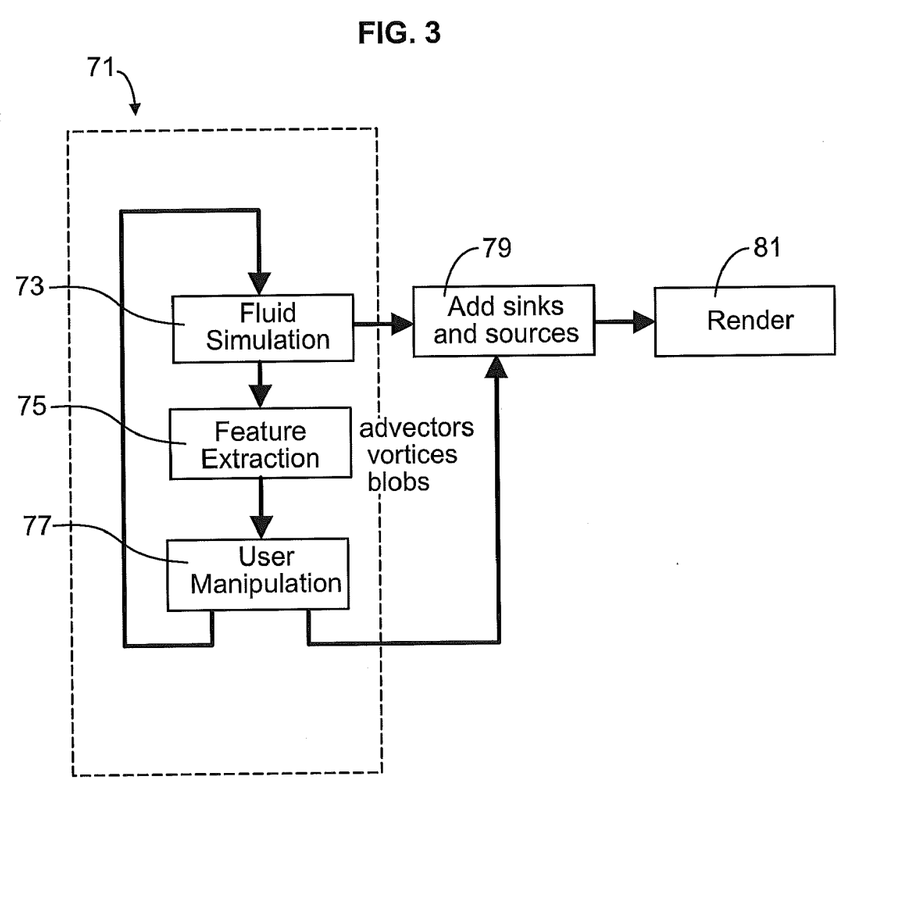
FIG. 3 illustrates a modeling processing loop.

FIG. 3 illustrates one embodiment of a modeling processing loop. Divergent features are not added in the simulation loop, but are rather added in the one-time velocity field used for rendering. Users can choose to work exclusively with these high-level features while the simulation runs as a transparent background process.

Thus, naturally occurring behavior in the simulation can be directly manipulated. The strong correlation between the features and the simulation enables the user to make focused adjustments. The system continuously extracts features from the user's adjustments, which allows the user to adjust the flow animation using these features, and applies the resulting feature changes back into the simulation. Embodiments of the system are able to run fast enough so as to utilize an interactive Navier-Stokes simulation. The results may be rendered in real-time with hardware-accelerated advected texturing. The results convey realistic, high-resolution simulations created with natural, adjustable, high-level primitives.

The present invention efficiently manipulates high-level flow structures in an interactive Navier-Stokes simulation. Features in the simulation permit a user to work with the individual regions in which they occur. For every frame, features may be extracted from a simulation and presented as adjustable glyphs. Users can interactively "adjust" features while the simulation runs by applying elementary transformations to the feature subvolumes. The embodiment shown in FIG. 3 includes a modeling processing loop having a feature-driven interface for a simulation step 71 using fluid simulation 73, feature extraction 75, and user manipulation 77.

The fluid simulation 73 realistically evolves the gas scene using a stable fluids solution. The simulations can be generated at resolutions of 32×32×32 to ensure interactive performance. These techniques may be easily scaled to higher resolutions.

At every simulation step 71, feature extraction 75 occurs in the illustrated embodiment. The system detects relevant flow features, for example, advectors, vortices and blobs, and overlays the spatial boundaries on the simulation. Advectors create flow advection. Vortices create swirling flow motion (defined by the appropriate equations). Blobs are collections of gas density. The features may be represented with ellipsoidal regions, which can be reoriented within the simulation domain. For flow features, velocities can also be rescaled to vary the magnitude or reverse the flow.

These manipulations may be reflected back onto the simulation grid as a spatial transformation on the ellipsoidal subvolume. User manipulation 77 allows the user to reposition, scale, and rotate spatial areas of the feature. A frame of the user manipulation process 77 is described in further detail below.

Sinks and sources 79 can be added after the simulation step 71. Sinks and sources 79 are useful to represent the divergent behavior of natural phenomena, for example, explosions, whirlpools, and tornadoes. However, such divergent behavior does not occur in ideal (non-compressible) fluids. In fact, this behavior is canceled in the simulation by the divergence-free transform. To implement this divergent behavior, the system subtracts divergent forces before the Navier-Stokes simulation, and adds them back in after the simulation step 71. Accordingly, these forces may persist through rendering and manipulation, but may be intentionally removed from the simulation step 71. Finally, the simulation is rendered 81, which will be further described in reference to FIG. 5 below.

Figure 4:
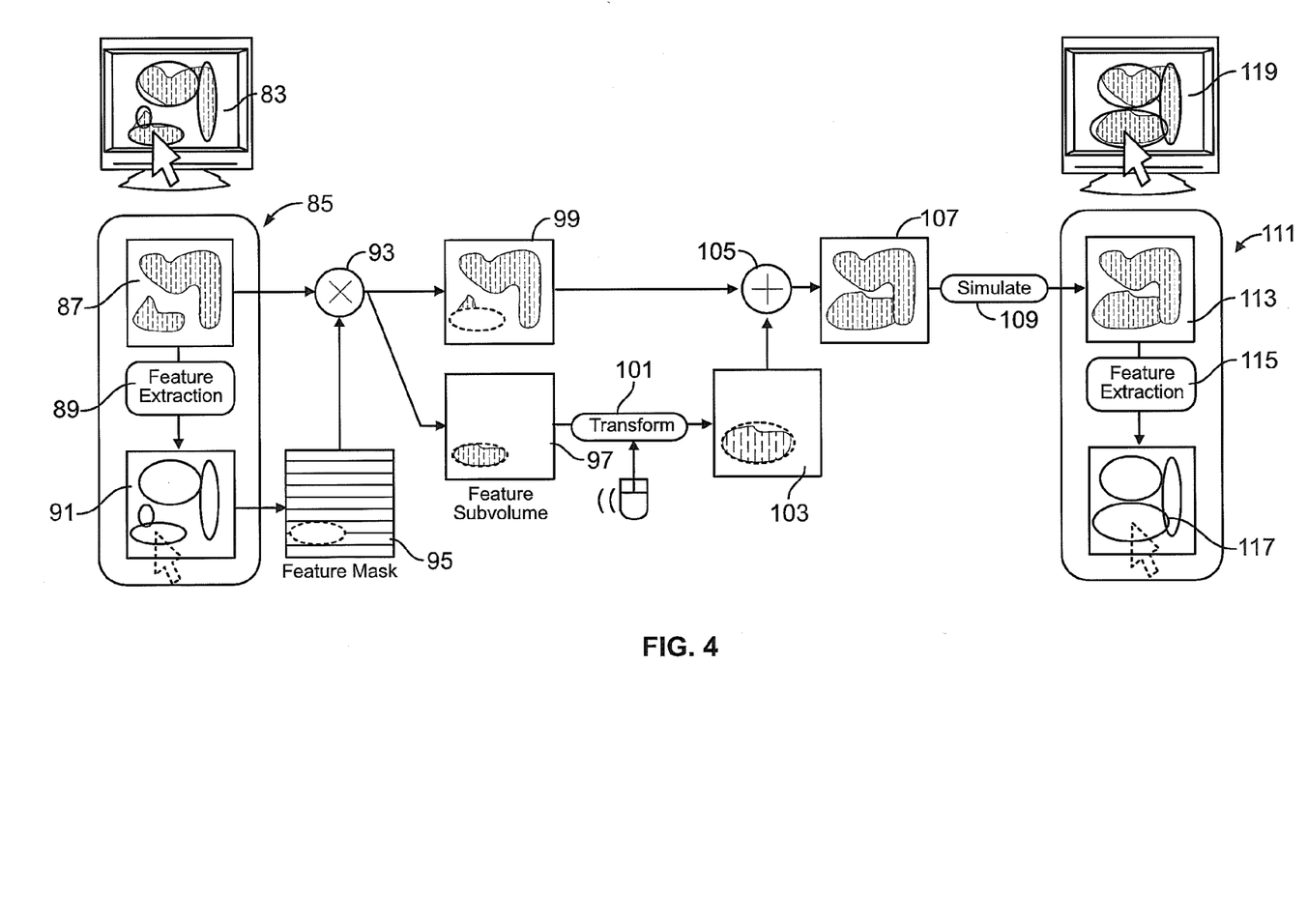
FIG. 4 illustrates one frame of the interactive user manipulation process illustrated in FIG. 3.

FIG. 4 illustrates one frame of the interactive user manipulation process 77 described above. A feature mask is the detected area that the feature occupies. Thus, the 3D extent of the portion of the volume that the feature occupies can be determined. Feature subvolume is the portion of the volume that contains the feature. The feature's subvolume is subtracted from the simulation grid, appropriately transformed, and written back into the volume, similar to cutting and pasting regions on a raster grid. Density fields on affect the density field and velocity features only affect the velocity field. To fill the space vacated by the feature, densities are set to zero, and velocities are approximated by averaging the border voxels' velocities. This editing process can leave coarse compositing artifacts. Committing small manipulations over many frames can minimize these errors, but for large changes, the feature's boundary values may be coarsely inconsistent with the surrounding simulation. To smooth the transition around the feature subvolume, its boundaries are "feathered"—smoothly blended together—when writing it into the simulation grid. To ensure mass conservation, a divergence-free projection is used before the subsequent simulation step. The user interacts with the simulation through the features by building initial conditions, using real-time manipulation and revising simulations.

The present system utilizes features to identify initial conditions such as a high-level primitive to describe the initial forces driving a simulation. In addition to constructing the environment by brushing velocity and density, users can write in new procedurally-based representations of features.

While the simulation runs, features can be guided by dragging them with a mouse using real-time manipulation. Since these changes occur in real-time, the user gets continuous feedback through the simulation.

A user can revise simulations by recording keyframes of a guided simulation and later fine-tune the flow over the timeline. Selecting a certain frame, densities and velocities can be adjusted in a way similar to building initial conditions.

When a change is made somewhere along the timeline, the present system permits the change to be applied as an adjustment to the keyframe at that point and, if desired, overwrite the subsequent keyframes with a simulation solution from that frame onwards.

In setting up and revising recorded simulation frames, the present system permits the simulation process to be paused to show the single frame of interest. When the density is not advected, it may be unclear how the new flow is pushing the density. Texture advection conveys the direction and rate of flow, which is instrumental in previewing the adjusted flow.

The present system presents an ellipsoidal decomposition of the density field. Embodiments of the present system permits three primitive velocity features to shape flow: uniform advections, vortices, and divergences. Each of these features can be created, removed, and modified in the interactive environment. Each feature needs an extraction algorithm to segment and quantify features from the simulation. To create a new feature, a procedural model is also required to sample it onto the grid. Both these methods are computationally simple enough to execute in real-time.

Vortices are easily recognized by human observers, but lack a complete, formal physical definition. For computer modeling and animation, a "multitude of material particles rotating around a common center" is considered. This is typically quantified as a velocity Jacobian with complex eigenvalues.

The vortex extraction method identifies regions with high vorticity and fits ellipsoids around them. Vorticity magnitude may be calculated as the magnitude of the curl of the velocity field $\|\nabla \times \xi\|$. Embodiments of the present system can cluster neighboring voxels with high vorticity and consider each cluster a separate vortex. To perform this operation quickly, a vortex may be seeded at each voxel with vorticity, and the neighboring vortices merge in order to satisfy the following criteria:

$$z_1 \cdot z_2 \geq \frac{\alpha}{r_{0_1} + r_{0_2}} \qquad \text{(Equation 5)}$$

$$|z_1 \times (c_1 - c_2)| \leq \alpha \qquad \text{(Equation 6)}$$

Here $c_i$ is the origin of vortex i, $r_{0_i}$ its vortex radius in voxels, and $z_i$ is a vector extending along the vortex's rotational axis. This criterion restricts merging vortices by the difference and distance from each other's rotational axes. $\alpha$ is an adjustable calibration term, usually near 2. As vortices grow, the merging criteria can become more restrictive. Though vortex cores are modeled as straight segments in this ellipsoidal model, in reality, they are not necessarily straight. For instance, where there are closed vortex cores that form plumes, the curved axis is subdivided into a series of straight segments. This restriction prevents merging more vortices that deviate from the prevailing axis.

If a pair of vortices (labeled 1 and 2) satisfies the merge criteria, they are replaced with a new vortex (labeled 0). Its vorticity $v_0$ and rotational axis $z_0$ are a radius-weighted interpolation of the original two.

$$t = \frac{r_{0_2}}{r_{0_1} + r_{0_2}}$$

$$z_0 = \frac{z_1 + t(z_2 - z_1)}{|z_1 + t(z_2 - z_1)|} \qquad \text{(Equation 7)}$$

$$v_0 = v_1 + t(v_2 - v_1) \qquad \text{(Equation 8)}$$

The resulting radius $r_{0_0}$ and axis length $|z_0|$ is scaled to the spatial extents of the source vortices' union. Classifying regions purely with vorticity may incorrectly classify non-vortex regions, which motivates more complex tensor decomposition and stream-line tracing schemes and a wealth of vortex extraction research. While more accurate methods of vortex extraction could be used, a more efficient vortex parameterization which the system can compute at every iteration provides the best results. Although, this technique may not necessarily correctly classify all vortices, this misclassification will likely occur infrequently and are small enough to be dismissed.

To create a new vortex feature, consider a point x within the vortex's radius $r_0$. A force is directed along the cross product of the direction to the point and the vortex's rotation axis z. The force is scaled to the user defined magnitude v, rolling off with distance. The following function is used to calculate the force, where r=x−c.

$$f(x) = \begin{cases} \left(1 - \frac{\|r\|}{r_0}\right) \frac{r \times z}{\|r \times z\|} v & \|r\| \le r_0 \\ 0 & \|r\| > r_0 \end{cases} \quad \text{(Equation 9)}$$

To add a vortex to the simulation, the systems adds f(x) to all voxels x in the volume. This vortex model can be used to create cyclonic funnels, scaling and rolling motion in convective plumes, and to add additional swirling behavior in vapors.

As described above, the system subtracts divergent forces to persist through rendering and manipulation, but they are intentionally removed from the simulation step. As a result, divergent forces do not evolve or advect densities, but their force is still conveyed through advected textures. The force of a source or sink is defined by the following equation:

$$f(x) = \begin{cases} \left(1 - \frac{\|r\|}{r_0}\right) \frac{r}{\|r\|} v & \|r\| \le r_0 \\ 0 & \|r\| > r_0 \end{cases} \quad \text{(Equation 10)}$$

where positive values of v define sources and negative values are sinks. This feature is confined to a user defined area and does not evolve through the simulation. Consequently, the restricted domain does not require feature extraction since its boundaries are already defined. Embodiments of the present system simply use the ellipsoidal region of the current frame for the following frame.

For example, sinks can draw density in toward the vortex initially forming the funnel of a tornado. This motion conveys a condensation funnel rolling down along the central axis that is simultaneously swirled by a vortex feature.

Regions of uniform advection are useful for adjusting prevailing winds, steady jets, and streams. Typically, directly painting densities into a simulation produces a plume which may not advect density as uniformly as desired. Certain embodiments of the present invention include uniform advection features and accordingly users can control the velocity uniformity within its bounds. These primitives provide a more direct way to steer density because users are directly adjusting the direction and magnitude of an area.

To create an area of uniform advection, the area is blended with the advection vector v using distance-based roll-off:

$$f(x) = \begin{cases} \left(1 - \frac{\|r\|}{r_0}\right) \frac{r}{\|r\|} v & \|r\| \le r_0 \\ 0 & \|r\| > r_0 \end{cases} \quad \text{(Equation 11)}$$

Uniform advection regions are extracted using basic clustering. The simulation grid is traversed, gathering neighboring voxels with similar velocities within a user-defined threshold. These clusters are then fit to an ellipsoid and presented to the user. Upon manipulation, the domain's velocities are overwritten with the velocity specified by the user.

An intermediate step may be redirected and scaled down to alter the final solution. Since the extracted feature encapsulates a neighborhood of consistent velocities, the adjustments holistically changes the rising motion, permitting a higher level of manipulation.

Figure 5:
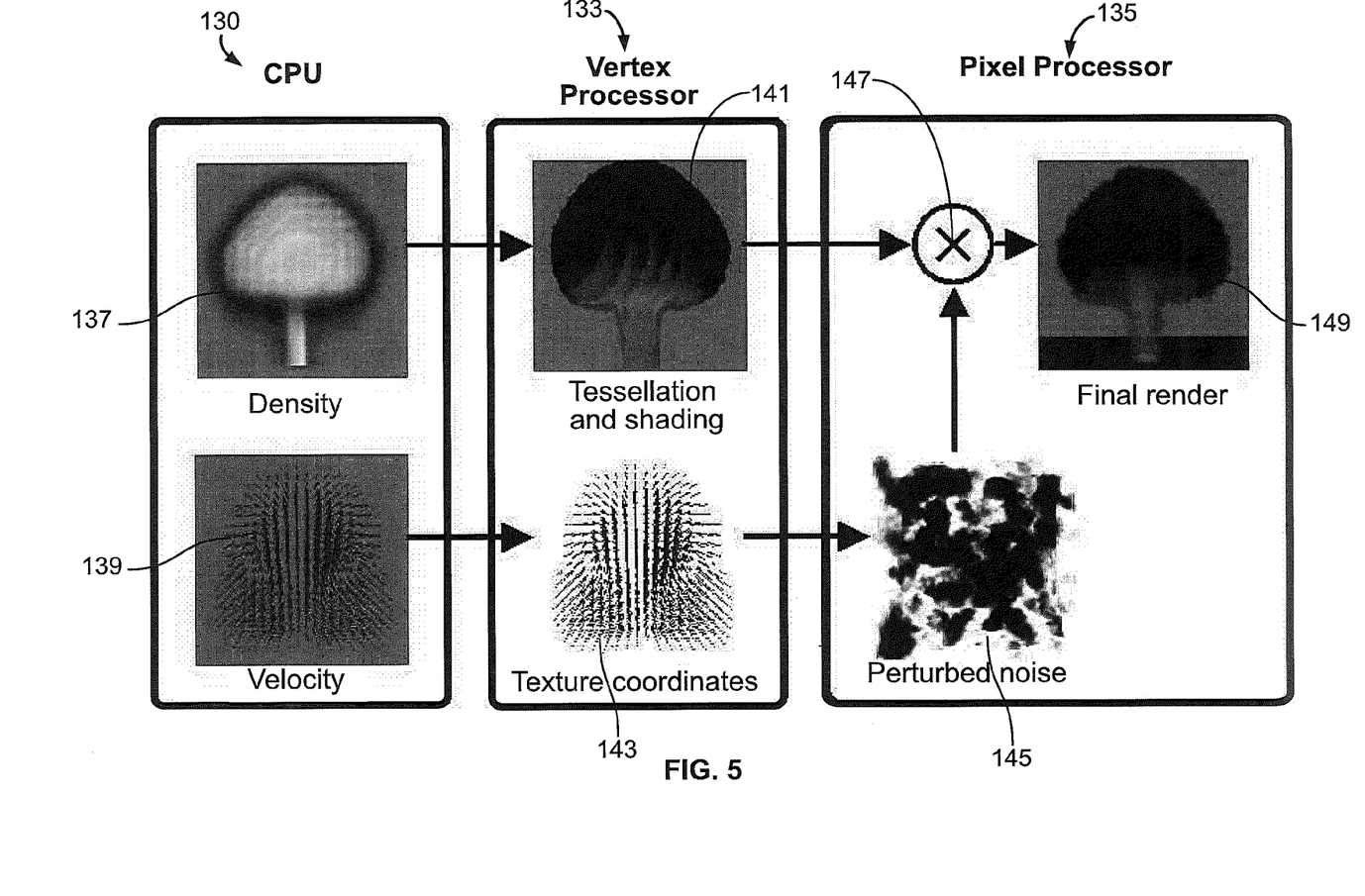
FIG. 5 illustrates the rendering process.
Figure 6:
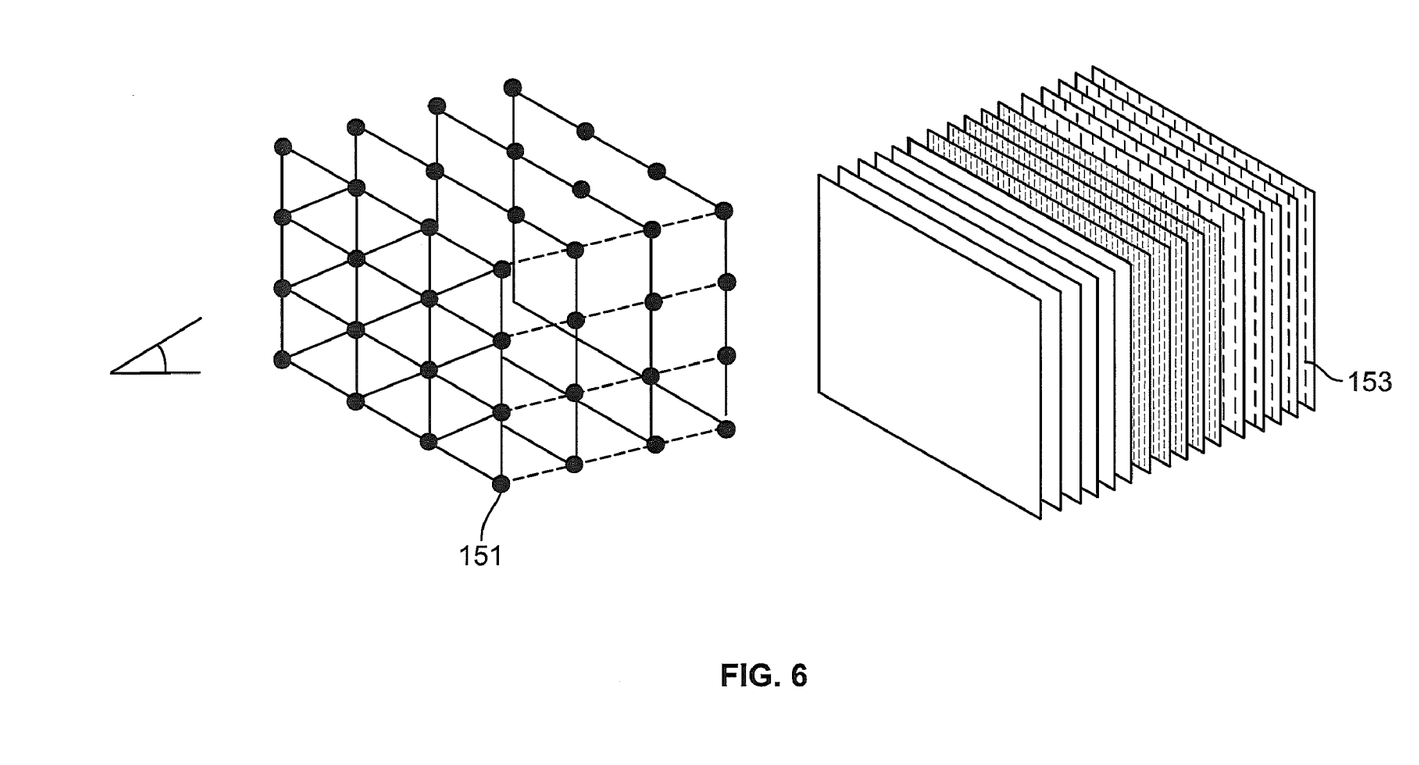
FIG. 6 illustrates an interpolation of intermediate values.

To distribute rendering processes over the available processing units, rendering may be processed in two parts, as shown in FIG. 5. A coarse density grid d(t) is computed and lit by the CPU 130 and vertex processor 133. This grid is defined by the user, whether by a discretized collection of metaball primitives, or using an existing simulation-driven density field. As shown in FIG. 6, voxels 151 (used as vertices) form tessellated planes 153, or axis-aligned slicing planes, to interpolate intermediate values. To increase depth continuity, intermediate slices are rendered as well. After rasterization, the screen-resolution volume is textured and blended onto the frame buffer.

The CPU 130 can handle user input, compute the next iteration of the simulation, and execute other modeling processes. It may also calculate the shadowing at each voxel to avoid this integration later.

In order that the latest density field 137 may be sent to the vertex processor 133, the density field 137 and flow volume 139 may be sampled as vertex attributes. Therefore, a vertex is positioned at each voxel and slicing planes are oriented along one of the density axes. For visual continuity, the high frequency noise texture may require more slices then the density resolution. Additional slices can be inserted to provide resolution, but the system will only sample along the nearest density voxel in software. Though this may result in over sampling of the density grid, artifacts may be unnoticeable because of the noise texturing.

Vertices are oriented along the light direction to integrate along and propagate light. Since vertices have been constrained earlier along the density axes, the light direction is limited to these axes as well.

The vertex processor 133 transforms the spatial coordinates into screen space, and generates advected texture coordinates 143. A connectivity array assembles the vertices into triangle primitives that form the slicing planes oriented toward the viewing ray.

The slices are rasterized with perspective-corrected texture coordinate interpolation. The fragment processor may be programmed to look up each texture coordinate and perform the weighted sum defined earlier by the crossfading function. Following the variance-invariant noise summation, the noisy gas media is multiplied with the visible simulation density, and shaped by user controls to produce the final slice fragment.

The realistic and efficient lighting of translucent volumes is a challenging task. Volume rendering equations are extended to model chromatic, an isotropic light scattering and absorption, while employing hardware-based approaches to accelerate rendering. A persistent challenge is to reduce the integrals describing the incident light along the ray reflected toward the eye. For multiple scattering, every visible point theoretically influences every other point, significantly complicating calculations.

Another advantageous feature of the present system is control. Visual phenomena, such as coloration at sunset and rainbows, may be produced through accurate light transport models. As previously described, physically-based approaches require certain conditions to produce the desired effect. To produce these effects through controllable features, the lighting model easily adjusts shadowing and coloring properties. For an observer at point x and a single light source at point 1, the following equation may be used.

$$L(x)=L(b)T(b,x)+\int_x^b T(s,x)G(L(l)T(l,s)+I(s),\theta)ds \quad \text{(Equation 12)}$$

L(b) is the background color or sky texture, and T(x, y) is the fraction of light penetrating the volume:

$$T(x,y)=e^{-\int_y^x d(s)ds} \quad \text{(Equation 13)}$$

with d(s) as the extinction coefficient at point s. This is sampled from the density volume d(t). I(x) is a global illumination approximation of the incident light at point x:

$$I(x) = \delta\|\nabla d(x)\| \quad d(x) < \varepsilon \quad \text{(Equation 14)}$$

$$0 \quad d(x) \geq \varepsilon \quad \text{(Equation 15)}$$

Incident light is added as some fraction δ of the gradient magnitude. Users may limit this to densities below a small user-adjustable ε, which can be around the fringes of gas densities. As a result, edges of natural phenomena appear brighter, emulating ambient global light. G(I, θ) serves as a user-defined color-mapping function operating on the incident light I and phase angle θ. This function provides control of the color of the gas using intuitive "shadow" and angular phase function controls. Simple functions assume isotropic diffusion and map incident light to a ramp from bright $c_{lit}$ to dark $c_{shadowed}$ colors as a simple linear interpolation:

$$G(I,\theta)=(1-I)c_{shadowed}+Ic_{lit} \quad \text{(Equation 16)}$$

Figure 7:
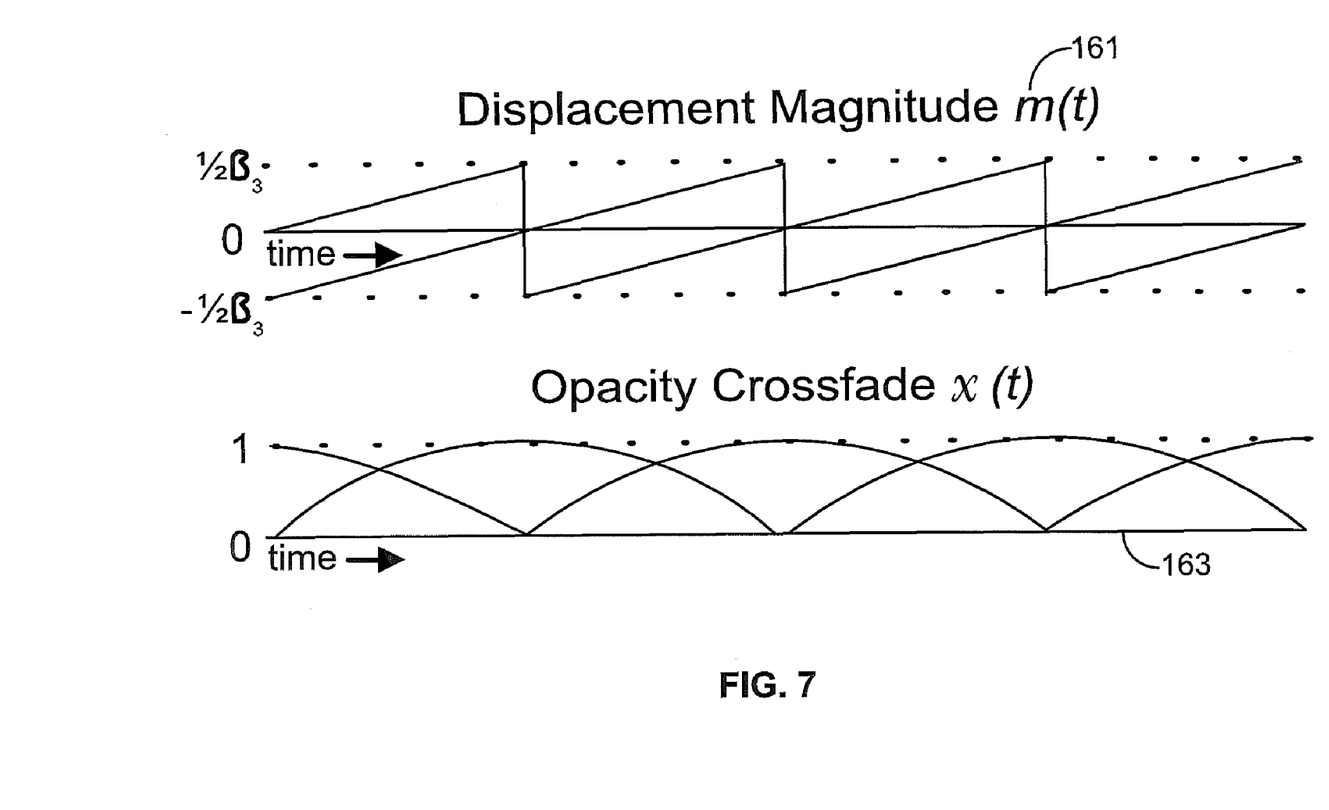
FIG. 7 illustrates the correlation graph.

To create and animate finer resolution detail, embodiments of the present system can utilize advected texturing to deform a high frequency noise texture. Advected texturing is based on the moving textures technique which advects texture coordinates backwards along a velocity field and resets back to some initial position after some period to prevent excessive stretching of the original texture. To avoid the inconsistency in animation when the coordinates reset, a crossfading blending function can be used to weigh between multiple simultaneous advecting textures that regenerate when their blending weight equals 0. FIG. 7 illustrates the correlation between the normalized displacement 161 of the texture coordinates and the crossfaded opacity 163 for that texture. Shown in FIG. 7 is phase shifted crossfading and displacement curves for two textures. For example, the opacity is equal to 0 when the displacement produces jumps.

Moving textures is a more efficient substitute to Line Integral Convolution (LIC) for flow visualization. LIC requires an efficient loop-back path to update the basis texture. Uploading 3D volume textures to main memory can be an expensive process. On the other hand, moving textures requires updating a smaller volume of velocity vectors without requiring any read-back. Furthermore, the resulting distorted volume is memory-less in that the current displacement can be calculated without accumulating previous displacement. Several improvements to moving textures are presented. First, velocity strain constitutes texture distortion over time. Second, a crossfading function is dynamically adapted to progress at the local magnitude of strain. Since linearly blending a non-linear distribution of random variables may not preserve statistical properties of that noise, delaying these non-linear operations (i.e., absolute values) after blending improves consistency. Finally, high-resolution vortices are synthesized with flow noise.

Figure 8:
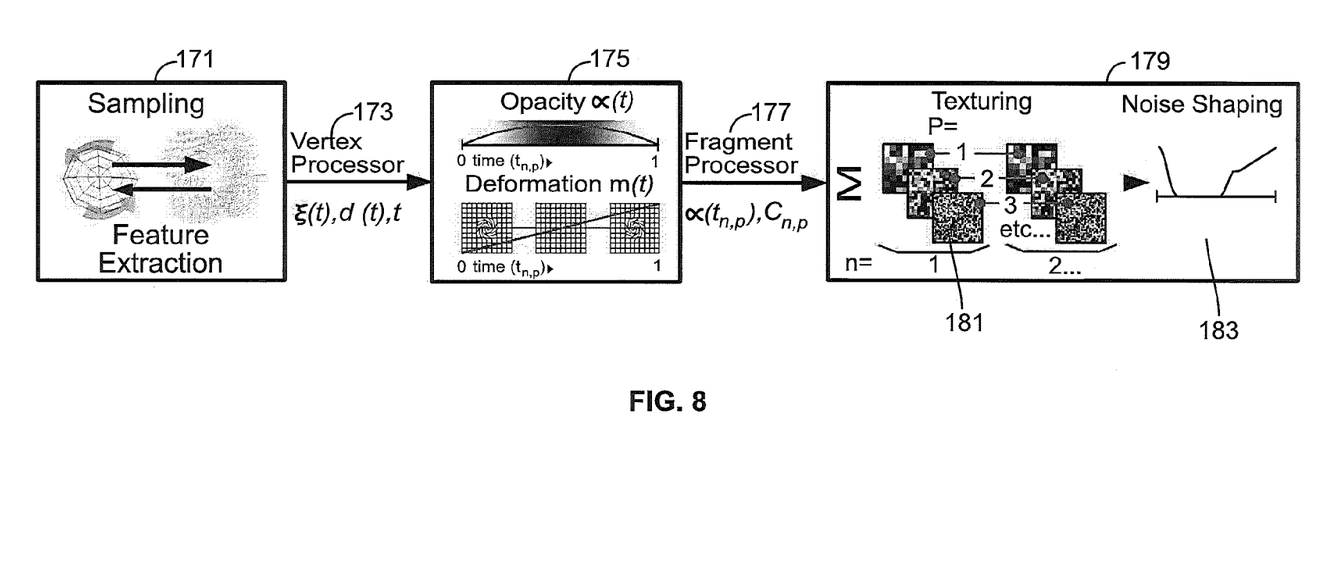
FIG. 8 illustrates a flow chart to produce a texture.

This technique advantageously continuously adapts strain, instead of blending between several regeneration frequencies, improves the consistency of statistical properties of the blended noise, and adapts processing to graphics hardware. FIG. 8 is a flow diagram of a texture processing path. Known blending approaches have several problems. First, despite delaying the nonlinear turbulence operation after blending noise bases, blending moving textures with different regeneration frequencies may produce pulsating or incoherent feature evolution. Secondly, blending with multiple layers increases the sampling and blending operations. Using P octaves of noise and M time-shifted textures, N of these layers must be blended together requiring MNP composition operations (texture reads and blending).

Previously, blending operations used "temporal mip-mapping" and only considered the pair closest to the ideal latency (M=2). Rather than blending the layers closest to the desired regeneration frequency, a single layer (M=1) is adapted with a local regeneration frequency. Using more layers will more gradually transition between textures, permitting longer regeneration periods, but at the expense of performance.

The time-varying density volume is computed as the product of the simulation density field visualized and an advected texture moving along the simulation flow field ξ(t). The density is expressed as:

$$a(t)=s(d(t)g(t)) \quad \text{(Equation 17)}$$

s( ) is a basic bias and gain function to visually tune the final visible density. d(t) is a scalar density field advected by the velocity field ξ(t). g(t) is the advected texture. Components of this function may be computed on the CPU, and finally combined in the vertex program.

$$g(t) = \left|\sum_{p=0}^{P-1} 2^{-p} \sum_{n=0}^{N-1} \alpha(t_{n,p})W(C(m(t_{n,p})))\right| \quad \text{(Equation 18)}$$

P represents the number of octaves in the turbulence sum and N is the number of layers to fade between. Originally, the absolute value was placed within the summation, but is moved outside to preserve linear blending properties. α(t) is a crossfading function equal to 0 at t=0 and t=1, and satisfies uniform variance across t. The crossfading function $$\alpha(t)=|\sin(\pi t)| \quad \text{(Equation 19)}$$

avoids this by amplifying the signal proportionally to the lost variance. W is a noise volume with values varying within [−1,1]. This ensures the expected value remains 0 when blending. C(t) is a backwards particle trace and may be used to find the texture coordinate at time t. The function C(t) will return the initial position of a point at time 0 that intersects the given point at time t. There are several approximations for C(t). For example, the system takes one Euler step along the flow ξ(t) backwards along t:

$$C(t)=C(0)-t\xi(t) \quad \text{(Equation 20)}$$

m(t) and the local periodic timeline $t_{n,p}$ advance the advected textures and control local deformation.

$$t_{n,p} = frac\left(\frac{n}{N} + \beta_{deformation}(\beta_{inertia})^p \left(t + \int_0^t e(q)\,dq\right)\right) m(t) = \quad \text{(Equation 21)}$$

$$\beta_{speed}\left(t - \frac{1}{2}\right)$$

frac(x) returns the fractional component of x, and e(t) is the strain tensor norm at time t. Adding the integral of strain to the timeline increases the crossfade rate around areas of greater deformation. Strain may be computed per vertex. The β values are positive values parameterizing the advected texture's attributes.

The system organizes variables hierarchically through a tree of parameter groups. At the top-most groups, the most common and general controls are exposed, and more detailed, specific controls under successive groups. The present system permits users to design complete natural phenomena using the most basic controls, or customize properties deeper in the tree.

Figure 9:
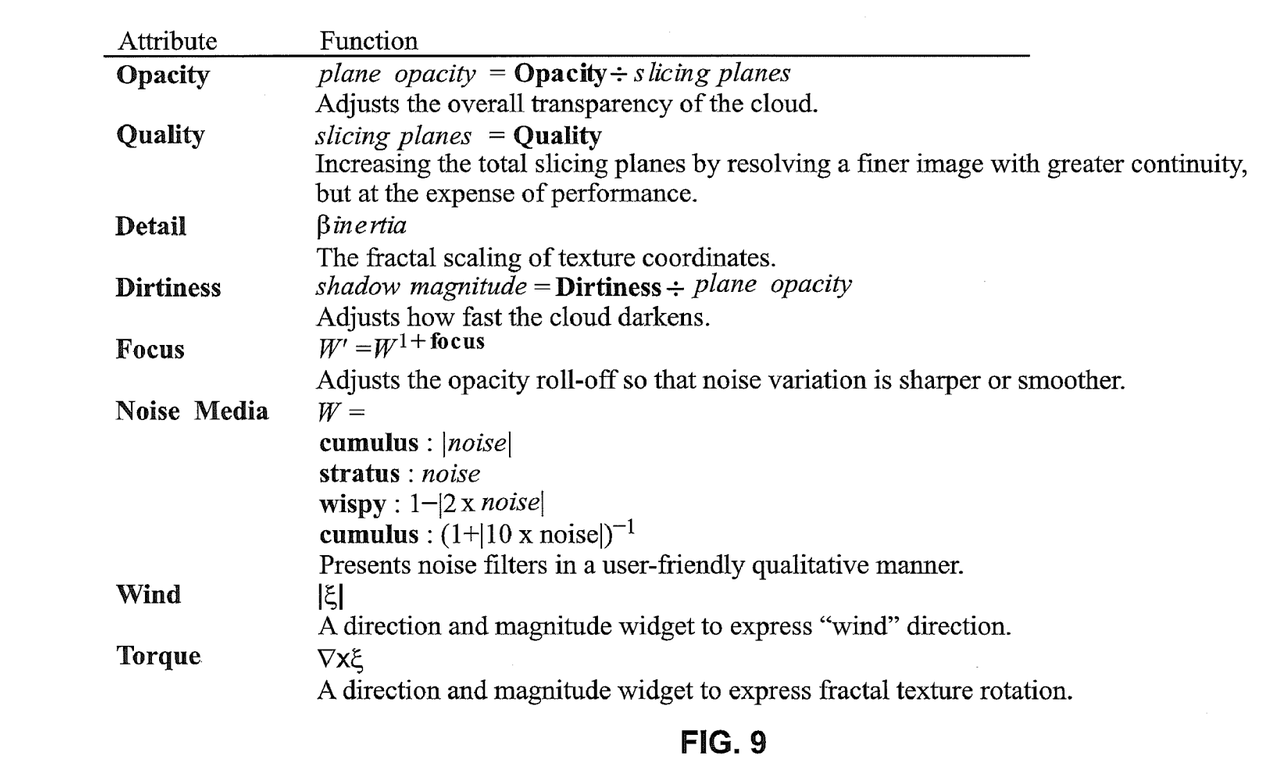
FIG. 9 identifies qualitatively independent parameter equations.

Some rendering parameters influence the image in multiple ways. For example, increasing the number of slicing planes may be used to integrate the volume in smaller steps, thereby increasing the visual opacity. Equations of certain qualitatively independent parameters are shown in FIG. 9. These attributes may be used to adjust an image along a single visual dimension without side-effects in another dimension. The present system may be used to express the number of slicing planes in terms of quality, where increasing this value resolves a finer image with greater continuity.

Accumulated opacity increases with the addition of slicing planes. Therefore, the present system may be used to scale the transparency of the slicing planes by the user-defined opacity divided by the number of slicing planes. The present system may include settings to permit finer adjustments of plane tessellation and selective octave rendering and in order to balance image quality and performance. The present system permits all variables to be saved and restored system-wide in order to revisit work.

The present system permits the sculpting of gassy media through controls for modeling and rendering noise. Focus adjusts the transparency roll-off (qualitatively, the blurriness toward the edges). By sharpening the transition, noise transitions appear sharper and better defined, while lower values ease the transition to create fuzzier, less defined edges. A dirtiness feature permits the adjustment of how gas darkens with depth. As slicing planes increase, the accumulated shadow grows, so this term is divided by the number of slicing planes. The actual lit and shadowed colors, along with the background, may be specified to simulate special lighting conditions, for example, a sunset. Phenomena scale is conveyed by the scale of the first octave. The fractal step in noise is modified as the detail control. The visual effect of adjusting detail modifies the size of the smallest characteristics, and is useful for creating smooth or rough detail.

As mentioned previously, the noise volume is smoothly evolved by turbulently transforming sequential octaves. For global gas movement (translation), the user controls a directional and magnitude widget for ambient wind. A similar interface controls torque, the fractal rotation of texture space. These transformation controls influence the selected tier of noise. In this way, users can model unique flow conditions at different altitudes. A special tier, Base, applies the transformation over all tiers first-octave noise, which conveys large-scale gas evolution and cohesion between tiers.

Users are permitted to define the density field d(t) as a collection of volumetric ellipsoids. As low-frequency noise effectively conceals the primitives shape, particle tools visualize this geometry for early design. Traditional particle animation mechanisms evolve the gas in a variety of ways. For example, users can project particles along a uniform wind field, useful for slowly scrolling cloudscapes. Finer control is achievable through individually key-framing particles, and interpolating their position and shape properties over time.

Thus, while a multitude of embodiments have been variously described herein, those of skill in this art will recognize that different embodiments show different potential features/designs which can be used in the other embodiments. Even more variations, applications and modifications will still fall within the spirit and scope of the invention, all as intended to come within the ambit and reach of the following claims.

What is claimed is:

1. A method for interactively modeling a natural phenomenon with a computer including a CPU, graphics hardware, a display, and an input device for receiving instructions from a user, the method comprising the steps of:
   providing a physical simulation model including a procedural simulation model of the natural phenomenon, wherein the procedural simulation model includes a simulation grid and a plurality of flow primitives;
   extracting the procedural simulation model from the physical simulation model using interactive techniques;
   modifying the plurality of flow primitives including the step of adjusting parameters including one or more selected from the group comprising of vortices, divergences, advectors, blobs, sources, sinks and densities;
   repositioning spatial boundaries of the plurality of flow primitives on the procedural simulation model;
   utilizing a collection of preset noise filters, volumetric textures and texture transformations to describe the detail and the type of the natural phenomenon;
   synchronizing the physical simulation model and the procedural simulation model; and
   simulating the natural phenomenon.

2. The method for interactively modeling a natural phenomenon according to claim 1, wherein the plurality of flow primitives includes one or more selected from the group comprising of sources, sinks, advections, divergences, blobs, densities and vortices.

3. The method for interactively modeling a natural phenomenon according to claim 1, wherein said synchronizing step further comprises the step of recalculating the physical simulation model in response to changes to the procedural simulation model.

4. The method for interactively modeling a natural phenomenon according to claim 1, wherein said synchronizing step further comprises the step of requantifying the flow primitives.

5. The method for interactively modeling a natural phenomenon according to claim 1, wherein the natural phenomena is a gaseous phenomenon.

6. The method for interactively modeling a natural phenomenon according to claim 1, wherein the natural phenomena is a plume of a hot gas.

7. The method for interactively modeling a natural phenomenon according to claim 1, wherein the natural phenomena is a flame of a fire.

8. The method for interactively modeling a natural phenomenon according to claim 1, wherein the natural phenomena is a cloud.

9. A method to simulate characteristics perceived in natural phenomenon, wherein the method is performed on a computer including a display device and an input device, the method comprising the steps of:

extracting one or more flow primitives from a physical simulation, wherein the one or more flow primitives includes advectors, vortices and blobs;

manipulating the one or more flow primitives using interactive techniques on the input device to obtain manipulated features;

applying the manipulated features into the physical simulation including the step of overlaying the spatial boundaries of the manipulated features on the physical simulation; and rendering the natural phenomenon on the display device.

10. The method to simulate characteristics perceived in natural phenomenon according to claim 9, wherein said applying step further includes the step of adding sinks and sources representing divergent behavior.

11. The method to simulate characteristics perceived in natural phenomenon according to claim 9, wherein the natural phenomena is a gaseous phenomenon.

12. The method to simulate characteristics perceived in natural phenomenon according to claim 9, wherein the natural phenomena is a plume of a hot gas.

13. The method to simulate characteristics perceived in natural phenomenon according to claim 9, wherein the natural phenomena is a flame of a fire.

14. The method to simulate characteristics perceived in natural phenomenon according to claim 9, wherein the natural phenomena is a cloud.

15. An improved method based on a Navier-Stokes simulation and a procedural simulation to produce simulated natural phenomenon through use of computer including a display device, the improved method comprising the steps of:

extracting the procedural simulation from the Navier-Stokes simulation;

modifying the procedural simulation including the step of adjusting parameters to obtain modified features;

applying the modified features to the procedural simulation including the step of repositioning spatial boundaries of the modified features on the procedural simulation;

utilizing one or more divergent forces selected from the group comprising of preset noise filters, sinks, sources, volumetric textures and texture transformations applied to the procedural simulation to describe the detail and the type of the natural phenomenon;

synchronizing the procedural simulation and the Navier-Stokes simulation; and rendering the simulated natural phenomenon on the display device.

16. The improved method based on a Navier-Stokes simulation and a procedural simulation to produce simulated natural phenomenon according to claim 15, wherein the natural phenomena is a gaseous phenomenon.

17. The improved method based on a Navier-Stokes simulation and a procedural simulation to produce simulated natural phenomenon according to claim 15, wherein the natural phenomena is a plume of a hot gas.

18. The improved method based on a Navier-Stokes simulation and a procedural simulation to produce simulated natural phenomenon according to claim 15, wherein the natural phenomena is a flame of a fire.

19. The improved method based on a Navier-Stokes simulation and a procedural simulation to produce simulated natural phenomenon according to claim 15, wherein the natural phenomena is a cloud.

\* \* \* \* \*